April 21, 1964  R. HÖSLI  3,129,594
DIRECTIONAL GYROSCOPE
Filed Sept. 17, 1959  2 Sheets-Sheet 2
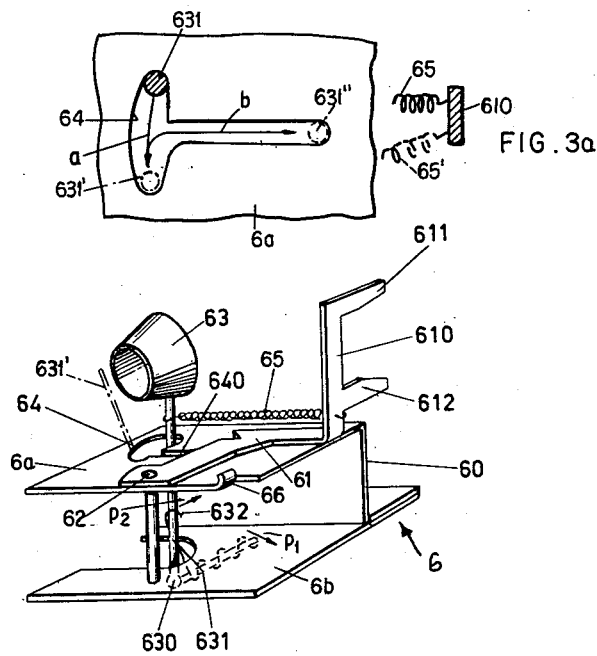
FIG. 3a
FIG. 3
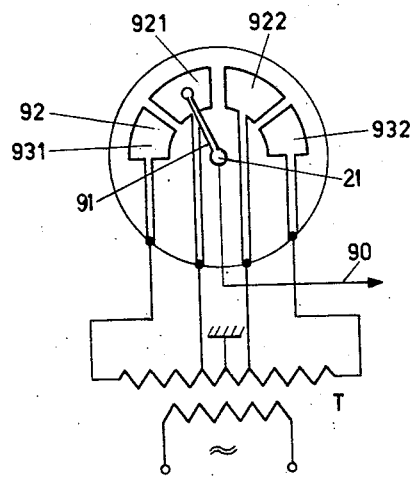
FIG. 4
INVENTOR.
Rudolf Hösli
BY Michael S. Striker
Attorney United States Patent Office 3,129,594
Patented Apr. 21, 1964

3,129,594
DIRECTIONAL GYROSCOPE
Rudolf Hösli, Glattbrugg, Switzerland, assignor to
Contraves AG, Zurich, Switzerland
Filed Sept. 17, 1959, Ser. No. 840,646
Claims priority, application Switzerland Sept. 26, 1958
6 Claims. (Cl. 74—5.12)

The present invention relates to directional gyroscopes for moving systems, such as rockets or other types of missiles.

An important object of the invention is to provide a directional gyroscope of very simple and comparatively cheap construction in which the uncaging of gimbal frames depends upon and follows the setting in rotary motion of the gyro rotor.

Another object of the invention is to provide a rocket or like missile embodying the directional gyroscope of the above outlined characteristics, wherein the ignition of rocket charge depends upon and is subsequent to the setting in motion of the gyro rotor and uncaging of the gimbal frames, i.e. the rocket cannot be set in motion unless the gyro rotor is properly driven and in the gimbal frames unlocked.

A further object of the invention is to provide a novel type of gyro rotor and a novel system for imparting angular motion thereto.

An additional object of the invention is to provide improved bearings for the journals of gimbal frames and for the shaft of the gyro rotor.

Still another object of the instant invention is to provide a regeneratable gas jet producing assembly for rotating the gyro rotor.

A yet further object of the invention is to provide a novel system for locking and unlocking the gimbal frame of a directional gyroscope in dependency on proper rotation of the gyro rotor.

A more specific object of the invention is to provide an electric circuit for the igniter of the charge in a rocket or like missile which prevents ignition of the rocket charge before the gyro rotor is set in motion and the gimbal frames are unblocked.

As is known, presently utilized directional gyroscopes comprise a gyro rotor which is mounted in gimbal frames and is driven by a motor or the like. The gimbal frames are locked or blocked, i.e. prevented from performing movements with respect to the device in which the gyroscope is mounted, before and while the gyro rotor is set in angular motion to be thereupon released in order to indicate changes in the position of the gyroscope supporting device. The present invention is based on the recognition that, especially in short-range missiles, such as antitank rockets and the like, the gyro rotor need not be positively driven for the duration of the entire flight but that it is sufficient to impart thereto a comparatively high initial angular speed whereupon the rotor is free to run out, i.e. to continue its rotary motion merely by its own inertia until arrested by friction. In other words, it is considered sufficient in certain types of missiles and other moving objects to impart to the gyro rotor a comparatively strong impulse of rather short duration, and to thereupon permit the rotor to continue its rotary motion by inertia alone.

The novel directional gyroscope comprises a gyro motor which is shaped as a turbine wheel in that it is formed with a ring of vanes or blades, and a drive means for the rotor in the form of a gas jet producing assembly which directs a stream of gases tangentially against the turbine blades to impart a rotary impulse of short duration thereto. The gas generating system is stationary with respect to the gyro rotor and to the gimbal frames in which the rotor is installed. The outer gimbal frame is formed with suitable passages to permit entry and discharge of the gas stream, and the gimbal frames are held in locked position during the generation of gases, i.e. over the period during which the gyro rotor is positively driven.

The gimbal frames may be held in locked position by a novel system of pivotable lever means, and means is provided for automatically releasing the gimbal frames as soon as the generation of gases is terminated This last mentioned means preferably comprises a spring biased baffle which is connected with the aforementioned locking lever means and is located in the path of the gas stream which is discharged through one of the aforementioned passages in the outer gimbal frame and acts against the resilient means which constantly biases the baffle member into lever releasing position. As soon as the generation of gases is terminated, the spring means displaces the baffle and pivots the lever means to unlock the gimbal frames.

The novel directional gyroscope preferably further comprises switch means located in the circuit of the igniter for the rocket charge, the switch means permitting ignition of the charge only when the gimbal frames are already unlocked Thus, the proper rotation of the gyro rotor always precedes the unlocking of gimbal frames, and the unlocking of gimbal frames precedes the ignition of the rocket charge The novel features which are considered as characteristic for the invention are set forth in particular in the appended claims. The invention itself, however, both as to its construction and its method of operation, together with additional objects and advantages thereof, will be best understood from the following description of a specific embodiment when read in connection with the accompanying drawings, in which:

FIG. 3 is a perspective view of the locking and releasing system for the gimbal frames;

FIG. 3a is a fragmentary horizontal section as seen in the direction of arrows from the line IIIa—IIIa of FIG. 1; and FIG. 4 is a schematic representation of the direction sensing and indicating assembly.

Figure 1:
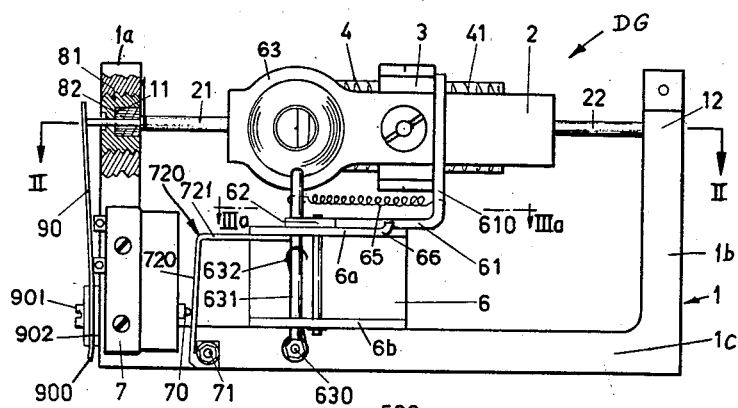
FIG. 1 is a front elevational view of the directional gyroscope, as seen in the direction of arrow I in FIG. 2.
Figure 2:
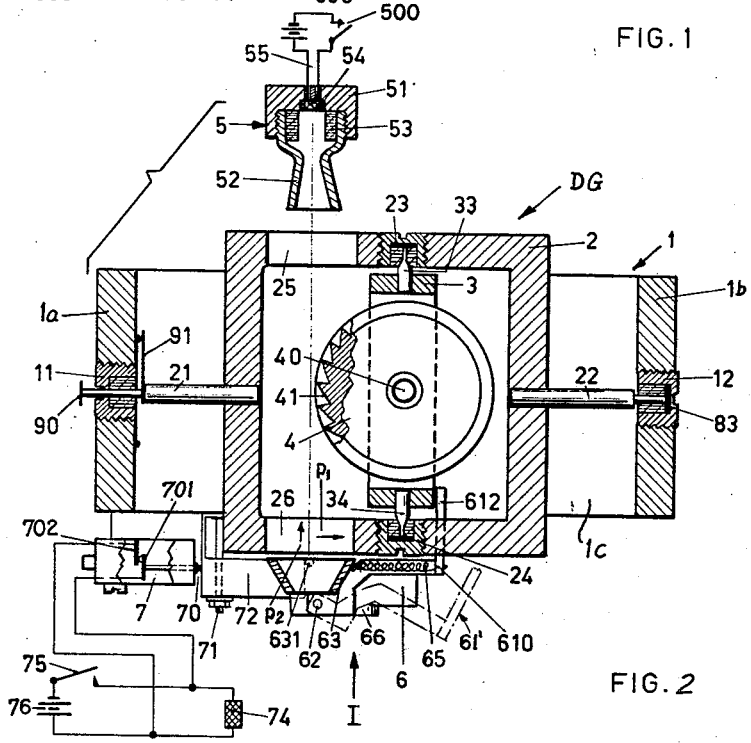
FIG. 2 is a horizontal section taken on the line II—II of FIG. 1, as seen in the direction of arrows.

Referring now in greater detail to the drawings, and first to FIGS. 1 and 2, there is shown a directional gyroscope DG which comprises a frame member or base support 1 mounted, for example, in an antitank rocket type missile. The gyro frame 1 is of U-shape and carries in its upwardly extending legs 1a, 1b bearings 11, 12 for shaft journals or pivots 21, 22, respectively, rotatably mounting a first or outer gimbal frame or ring 2. The latter carries two bearings 23, 24 for the journals 33, 34 of a second or inner gimbal frame or ring 3. The inner gimbal frame 3 carries bearing members for the shaft 40 of the gyro rotor 4. The rotor 4 is shaped as a turbine rotor and comprises an annular vane ring 41.

The gyro rotor 4 is driven by a gas jet generating system 5 comprising a stationary base member or holder 51 connected to the non-represented rocket or other device in which the directional gyroscope DG is installed, and a nozzle 52 screwed into or otherwise fixed to the base member 51. The rear end of the nozzle 52 defines a combustion chamber receiving a series of fuel rings 53 in contact with an igniter 54. The igniter is connected with electric conductors 55 and is ignitable from a distant point by a switch 500 which is adapted to complete the electric circuit of members 55. When the fuel charge 53 is ignited, a jet of gaseous combustion products is directed by the nozzle 52 in the tangential direction of gyro rotor 4 toward the vanes or blades 41. To permit unobstructed flow of the jet of gases from the discharge end of nozzle 52, the outer gimbal ring 2 is formed with a first cutout or inlet passage 25 and with an aligned second cutout or discharge passage 26.

A releasable blocking or locking system is provided for maintaining the gimbal frames 2 and 3 in the position of FIGS. 1 and 2. This system is best shown in FIGS. 3 and 3a and comprises a bell crank or angle lever 61 which is swingable about a vertical axis 62 and is pivotably supported by the gyro frame 1 by being mounted on the upper plate 6a of a supporting member 6 whose lower plate 6b is fixed to the base 1c of the U-shaped gyro frame 1. The upwardly extending arm 610 of the lever 61 carries a pair of prongs or extensions 611, 612 which, in the locking position of FIGS. 1 to 3, are adjacent to the inner gimbal frame 3 and simultaneously embrace or receive therebetween the outer gimbal frame 2. Thus, the extensions 611, 612 simultaneously block both gimbal frames in the starting position, i.e. in the position these frames assume before the rocket is fired.

A pin 631 has its spherical end 630 received in a complementary socket formed in the base 1c of the gyro frame 1, and carries at its other end a baffle or choke member 63 shaped as the mantle of a truncated cone. A torsion spring 632 is connected to the base 1c and engages the pin 631 to constantly urge the larger-diameter end of the baffle 63 toward the discharge passage 26 in the outer gimbal frame 2. The pin or baffle carrier 631 extends through a suitably shaped guide slot 64 formed in the upper plate 6a of the supporting member 6. The slot 64 communicates with a transverse slot 640 and forms with the latter a slideway or guide channel for the body of the pin 631. A tensioned coil spring 65 connects the member 631 with the arm 610 of the locking lever 61 and constantly biases the member 631 in a direction to abut with the nearest portion of the wall surrounding the slot 64 or to enter into the transverse slot 640.

The locking system of FIG. 3 operates as follows:

When the gas jet generating assembly 5 directs a stream of gaseous combustion products toward the vanes 41 and sets the gyro rotor 4 in rotary motion about its shaft 40, the gas jet discharged through the passage 26 in the outer gimbal frame 2 impinges against the converging inner surface of hollow conical baffle member 63 and urges the latter's carrier 631 against the force $P_2$ (FIGS. 2 and 3) of the resilient member 632 in a direction to move the baffle 63 away from the discharge passage 26. The pin 631 then moves in the direction indicated by the arrow a (FIG. 3a) and assumes its phantom-line position 631', shown in FIGS. 3 and 3a, in which it abuts against the rearmost portion of the wall structure surrounding the slot 64. The spring 65 then assumes the phantom-line position 65' which is shown in FIG. 3a. As soon as the generation of gases in the device 5 is terminated, the spring 632 acting in the direction of the arrow $P_1$ (FIGS. 2 and 3) immediately causes the pin 631 to move in the slot 64 from its phantom-line toward its full-line position, i.e. counter to the direction indicated by the arrow a. However, as the member 631 advances along the junction of the slots 64 and 640, the constantly acting resilient means 65 and spring 632 (see the force $P_2$ indicated in FIGS. 2 and 3) cause it to move in the direction indicated by the arrow b (FIG. 3a) and to enter into the transverse slot 640 into abutment with the blocking lever 61 (position 631″ in FIG. 3a). The lever 61 is then caused to pivot about its axis 62, and its arm 610 with extensions 611, 612 is moved away from locking engagement with the gimbal frames 2 and 3 (see the position 61' in FIG. 2 in which the lever 61 abuts against the stop 66).

As is shown in FIGS. 1 and 2, the gyro frame 1 supports the housing of an electric push button switch 7 whose push button 70 is constantly biased by a non-represented spring into abutment with the vertical arm 720 of an angle lever 72, the latter being mounted for rotation about a pivot axle 71 fixed to the base 1c of the gyro frame 1. The free end of the horizontal arm 721 forming part of the lever 72 abuts against the pin or baffle carrier 631. When the member 631 enters into the transverse slot 640, the lever 72 is free to pivot in clockwise direction about its axle 71 and the non-represented spring in the switch assembly 7 causes the push button 70 to move in a direction to the right (see FIG. 1) whereby the terminal or contactor 701 moves away from the stationary other terminal 702. Thus, the terminals 701, 702 complete the circuit in which the switch means 7 is installed as long as the bell crank 61 maintains the gimbal frames 2, 3 in locked position. The switch 7 is also installed in the electric circuit of an igniter 74 which starts the ignition of the propellant charge filling the non-represented rocket or the like. This circuit may be completed by closing a second switch 75, and further contains a source of electrical energy 76. Switches 7 and 75 are installed in such a way that the ignition of rocket charge by the igniter 74 can be brought about only when the switch 7 is open, i.e. when the gimbal frames 2, 3 are released or unblocked by the extensions 611, 612 of the lever 61. The unblocking of frames 2, 3, in turn, depends upon whether or not the gas jet producing assembly 5 is effective since the unblocking of said frames can be brought about only after the generation of gases in the combustion chamber of the assembly 5 is terminated.

Each bearing for journals or shafts 21, 22, 33, 34 and 40 comprises an externally threaded bolt 81 which is screwed into a corresponding tapped bore formed in the gyro frame 1 and in gimbal frames 2, 3, respectively. Each bolt 81 is formed with a recess receiving a journal box or bushing 82 made of porous material which is soaked in or saturated with a suitable lubricant and rotatably receives the respective journal. The free end of each journal abuts against a plate 83 made of bronze and inserted into the respective bolt 81, with the exception of the bolt forming part of the bearing 11 in the gyro frame 1. The plates 83 limit axial movements of the respective journals. As can be observed in FIGS. 1 and 2, the bearing 11 is completely traversed by the journal 21 which latter abuts against the free end of an electric contactor in the form of a leaf spring 90. This contactor is connected to the upright leg 1a of the gyro frame 1 by a screw 901 and is insulated from the gyro frame by a layer of insulating material 902. The lower end of the contactor 90 is connected with a test prong or direction indicating means 900. Through the journal 21, the member 90 is electrically connected with a sliding contact or wiper 91; thus, the latter is also electrically connected with the prong or clamp 900. The contactor 90 also performs the function of aforementioned plates 83 in that it serves as a yieldable stop against axial movement of the journal 21 in its bearing 11.

The inner side of the left-hand upright leg 1a forming part of the gyro frame 1 carries an electric sensing or direction indicating system 92 which is shown in full detail in FIG. 4. This system 92 comprises two pairs of collector plates 921, 922 and 931, 932 each of which is fixed to the leg 1a, these plates being in sliding contact with the wiper 91 when the journal 21 rotates. The collector plates are symmetrically connected with the grounded winding of a feed transformer T and are supplied with current of different potentials. The magnitude and phase of the potential is indicated by the test clamp 900 which latter thus indicates the extent of and the direction in which the outer gimbal frame 2 deviates from its starting position. This sensing system for indicating the inclination of the rocket with respect to the gyro rotor shaft 40, which latter defines the starting position, can be rendered more sensitive, if desired.

It will be seen that the operation of the sensing system shown in FIG. 4 and the unblocking of gimbal frames 2, 3 depend on proper operation of the gas jet generating system 5, and also that the ignition of rocket charge by the igniter 74, too, can be initiated only after the gyro rotor 4 is set in rotary motion by the gases developing upon ignition of the gas producing charge 53 in the combustion chamber of the assembly 5. Since the novel directional gyroscope is particularly suited for use in short-range missiles, such as anti-tank rockets, it is considered sufficient to produce a jet of combustion gases of only short duration, i.e. the gyro rotor need not be positively driven during the entire flight of a so constructed missile.

Without further analysis the foregoing will so fully reveal the gist of the present invention that others can, by applying current knowledge, readily adapt it for various applications without omitting features that, from the standpoint of prior art, fairly constitute essential characteristics of the generic and specific aspects of this invention and, therefore, such adaptations should and are intended to be comprehended within the meaning and range of equivalence of the following claims.

What is claimed as new and desired to be secured by Letters Patent is:

1. A directional gyroscope for moving systems comprising, in combination: a gyro frame; an outer gimbal frame rotatably mounted in the gyro frame, said outer gimbal frame having an inlet passage and an aligned discharge passage; an inner gimbal frame rotatably mounted in the outer gimbal frame; a gyro rotor comprising a vane ring and rotatably mounted in said inner gimbal frame; means stationary with respect to said gyro rotor for generating a jet of gases and for directing the jet of gases through said inlet passage, tangentially toward said vane ring and through said discharge passage whereby to set the gyro rotor in angular motion; and means for releasably locking said gimbal frames, said locking means comprising a lever pivotally supported by the gyro frame for movements between a first position in which it simultaneously locks both said gimbal frames and a second position in which it unlocks the gimbal frames, baffle means located in the path of gases passing through said discharge passage and comprising carrier means articulately connected to said gyro frame, means carried by the gyro frame and defining a slideway for said carrier means, and resilient means for constantly urging said baffle means in a direction counter to the direction of the jet of gases passing through said discharge passage and for constantly urging said carrier means into abutment with said lever for pivoting the lever into said second position, said slideway comprising a first slot for permitting movements of said carrier means in a direction to move the baffle means toward and away from said discharge passage and a second slot communicating with said first slot and permitting movements of the carrier means in a direction to pivot the lever into said second position, the baffle means being moved in the first slot and against the action of said resilient means by the gases passing through said discharge passage, and the resilient means moving the carrier means into the second slot when the generation of gases is terminated whereby the carrier means pivots the lever and the latter unlocks said gimbal frames.

2. A directional gyroscope for moving systems comprising, in combination: a gyro frame; an outer gimbal frame rotatably mounted in the gyro frame, said outer gimbal frame having an inlet passage and an aligned discharge passage; an inner gimbal frame rotatably mounted in the outer gimbal frame; a gyro rotor comprising a vane ring and rotatably mounted in said inner gimbal frame; means stationary with respect to said gyro rotor for generating a jet of gases and for directing the jet of gases through said inlet passage, tangentially toward said vane ring and through said discharge passage whereby to set the gyro rotor in angular motion; and means for releasably locking said gimbal frames, said locking means comprising a lever pivotally supported by the gyro frame for movements between a first position in which it simultaneously locks both said gimbal frames and a second position in which it unlocks the gimbal frames, baffle means located in the path of gases passing through said discharge passage and comprising carrier means articulately connected to said gyro frame, said baffle means having the shape of a hollow truncated cone whose larger-diameter end is closer to said discharge passage, means carried by the gyro frame and defining a slideway for said carrier means, and resilient means for constantly urging said baffle means in a direction counter to the direction of the jet of gases passing through said discharge passage and for constantly urging said carrier means into abutment with said lever for pivoting the lever into said second position, said slideway comprising a first slot for permitting movements of said carrier means in a direction to move the baffle means toward and away from said discharge passage and a second slot communicating with said first slot and permitting movements of the carrier means in a direction to pivot the lever into said second position, the baffle means being moved in the first slot and against the action of said resilient means by the gases passing through said discharge passage, and the resilient means moving the carrier means into the second slot when the generation of gases is terminated whereby the carrier means pivots the lever and the latter unlocks said gimbal frames.

3. A directional gyroscope for moving systems comprising, in combination: a gyro frame; an outer gimbal frame rotatably mounted in the gyro frame, said outer gimbal frame having an inlet passage and an aligned discharge passage; an inner gimbal frame rotatably mounted in the outer gimbal frame; a gyro rotor comprising a vane ring and rotatably mounted in said inner gimbal frame; means stationary with respect to said gyro rotor for generating a jet of gases and for directing the jet of gases through said inlet passage, tangentially toward said vane ring and through said discharge passage whereby to set the gyro rotor in angular motion; and means for releasably locking said gimbal frames, said locking means comprising a lever including a pair of extensions and pivotably supported by the gyro frame for movements between a first position in which said extensions are adjacent to one gimbal frame and embrace the other gimbal frame for preventing rotation of said gimbal frames and a second position in which the extensions are moved away and unlock the gimbal frames, baffle means located in the path of gases passing through said discharge passage and comprising carrier means articulately connected to said gyro frame, means carried by the gyro frame and defining a slideway for said carrier means, and resilient means for constantly urging said baffle means in a direction counter to the direction of the jet of gases passing through said discharge passage and for constantly urging said carrier means into abutment with said lever for pivoting the lever into said second position, said slideway comprising a first slot for permitting movements of said carrier means in a direction to move the baffle means toward and away from said discharge passage and a second slot communicating with said first slot and permitting movements of the carrier means in a direction to pivot the lever into said second position, the baffle means being moved in the first slot and against the action of said resilient means by the gases passing through said discharge passage, and the resilient means moving the carrier means into the second slot when the generation of gases is terminated whereby the carrier means pivots the lever and the latter unlocks said gimbal frames.

4. A directional gyroscope for moving systems comprising, in combination: a gyro frame; an outer gimbal frame rotatably mounted in the gyro frame, said outer gimbal frame having an inlet passage and an aligned discharge passage; an inner gimbal frame rotatably mounted in the outer gimbal frame; a gyro rotor comprising a vane ring and rotatably mounted in said inner gimbal frame; means stationary with respect to said gyro rotor for generating a jet of gases and for directing the jet of gases through said inlet passage, tangentially toward said vane ring and through said discharge passage whereby to set the gyro rotor in angular motion; means for releasably locking said gimbal frames, said locking means comprising a lever pivotably supported by the gyro frame for movements between a first position in which it simultaneously locks both said gimbal frames and a second position in which it unlocks the gimbal frames, baffle means located in the path of gases passing through said discharge passage and comprising carrier means articulately connected to said gyro frame, means carried by the gyro frame and defining a slideway for said carrier means, and resilient means for constantly urging said baffle means in a direction counter to the direction of the jet of gases passing through said discharge passage and for constantly urging said carrier means into abutment with said lever for pivoting the lever into said second position, said slideway comprising a first slot for permitting movements of said carrier means in a direction to move the baffle means toward and away from said discharge passage and a second slot communicating with said first slot and permitting movements of the carrier means in a direction to pivot the lever into said second position, the baffle means beng moved in the first slot and against the action of said resilient means by the gases passing through said discharge passage, and the resilient means moving the carrier means in the second slot when the generation of gases is terminated whereby the carrier means pivots the lever and the latter unlocks said gimbal frames; second lever means pivotably fixed to said gyro frame and abutting said carrier means in such a way as to be pivotable when the carrier means moves into said second slot; and an electric circuit including switch means comprising a spring biased member in constant abutment with said second lever means for completing the circuit when the carrier means is in said first slot and for opening the circuit when the carrier means moves into said second slot and the second lever means pivots.

5. A directional gyroscope for moving systems comprising, in combination: a gyro frame; an outer gimbal frame rotatably mounted in the gyro frame, said outer gimbal frame having an inlet passage and an aligned discharge passage; an inner gimbal frame rotatably mounted in the outer gimbal frame; a gyro rotor comprising a vane ring and rotatably mounted in said inner gimbal frame; means stationary with respect to said gyro rotor for generating a jet of gases and for directing the jet of gases through said inlet passage, tangentially toward said vane ring and through said discharge passage whereby to set the gyro rotor in angular motion; means for releasably locking said gimbal frames, said locking means comprising a lever pivotably supported by the gyro frame for movements between a first position in which it simultaneously locks both said gimbal frames and a second position in which it unlocks the gimbal frames, baffle means located in the path of gases passing through said discharge passage and comprising carrier means articulately connected to said gyro frame, means carried by the gyro frame and defining a slideway for said carrier means, and resilient means for constantly urging said baffle means in a direction counter to the direction of the jet of gases passing through said discharge passage for constantly urging said carrier means into abutment with said lever for pivoting the lever into said second position, said slideway comprising a first slot for permitting movements of said carrier means in a direction to move the baffle means toward and away from said discharge passage and a second slot communicating with said first slot and permitting movements of the carrier means in a direction to pivot the lever into said second position, the baffle means being moved in the first slot and against the action of said resilient means by the gases passing through said discharge passage, and the resilient means moving the carrier means in the second slot when the generation of gases is terminated whereby the carrier means pivots the lever and the latter unlocks said gimbal frames; and an electric circuit comprising switch means actuatable by said carrier means to complete the circuit when the carrier means is in said first slot and to open the circuit when the carrier means is in said second slot.

6. A directional gyroscope for moving systems comprising, in combination: a gyro frame; an outer gimbal frame rotatably mounted in the gyro frame, said outer gimbal frame having an inlet passage and an aligned discharge passage; an inner gimbal frame rotatably mounted in the outer gimbal frame; a gyro rotor comprising a vane ring and rotatably mounted in said inner gimbal frame; means stationary with respect to said gyro rotor for generating a jet of gases and for directing the jet of gases through said inlet passage, tangentially toward said vane ring and through said discharge passage whereby to set the gyro rotor in angular motion, said gas generating means comprising a nozzle defining a combustion chamber, a charge of combustible material in said chamber, igniter means in contact with said charge, and an electric circuit including switch means for initiating the combustion of said material by the igniter means; and means for releasably locking said gimbal frames, said locking means comprising a lever pivotably supported by the gyro frame for movements between a first position in which it simultaneously locks both said gimbal frames and a second position in which it unlocks the gimbal frames, baffle means located in the path of gases passing through said discharge passage and comprising carrier means articulately connected to said gyro frame, means carried by the gyro frame and defining a slideway for said carrier means, and resilient means for constantly urging said baffle means in a direction counter to the direction of the jet of gases passing through said discharge passage and for constantly urging said carrier means into abutment with said lever for pivoting the lever into said second position, said slideway comprising a first slot for permitting movements of said carrier means in a direction to move the baffle means toward and away from said discharge passage and a second slot communicating with said first slot and permitting movements of the carrier means in a direction to pivot the lever into said second position, the baffle means being moved in the first slot and against the action of said resilient means by the gases passing through said discharge passage, and the resilient means moving the carrier means into the second slot when the generation of gases is terminated whereby the carrier means pivots the lever and the latter unlocks said gimbal frames.

References Cited in the file of this patent
UNITED STATES PATENTS

| | | |
|---|---|---|
| 954,634 | Jones | Apr. 12, 1910 |
| 1,077,344 | Hennig | Nov. 4, 1913 |
| 1,316,363 | Hayden | Sept. 16, 1919 |
| 2,275,538 | Marvin | Mar. 10, 1942 |
| 2,413,621 | Hammond | Dec. 31, 1946 |
| 2,419,164 | Putman et al. | Apr. 15, 1947 |
| 2,620,669 | Braddon | Dec. 9, 1952 |
| 2,743,576 | Crockett | May 1, 1956 |